H. J. BENNETT.
APPARATUS FOR RAISING SHIPS.
APPLICATION FILED APR. 8, 1919.
1,314,119.
Patented Aug. 26, 1919.
3 SHEETS—SHEET 1.
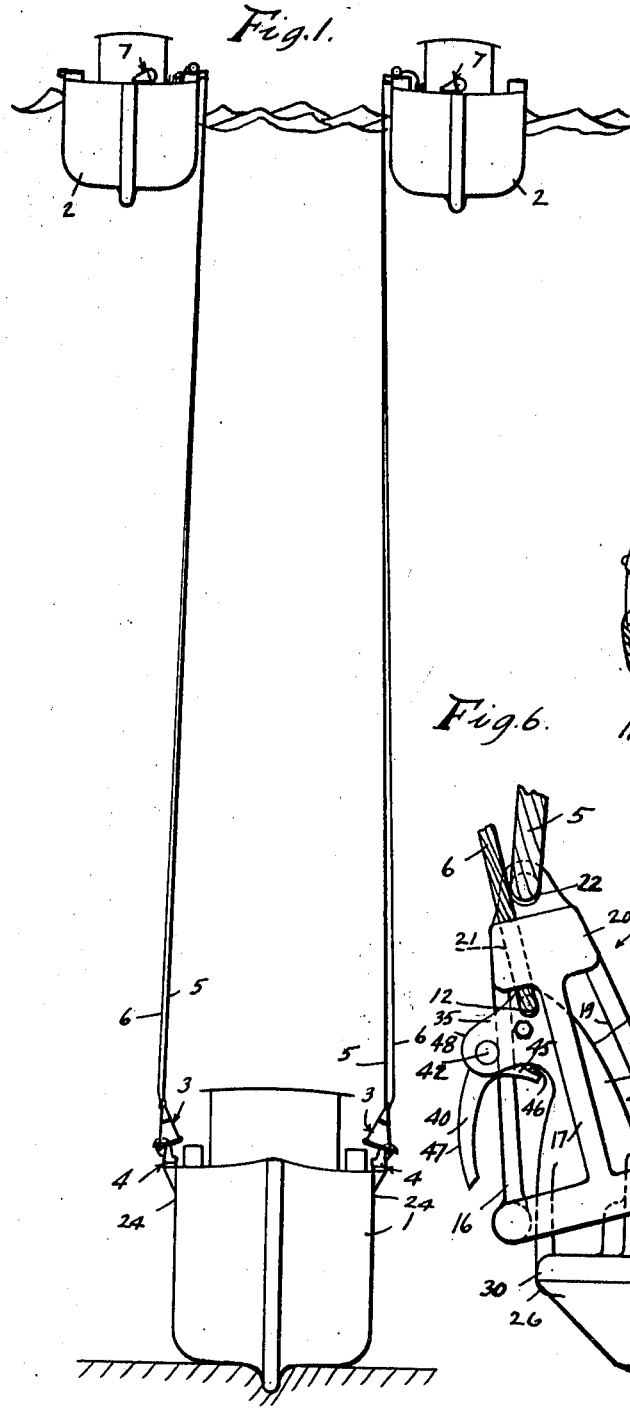
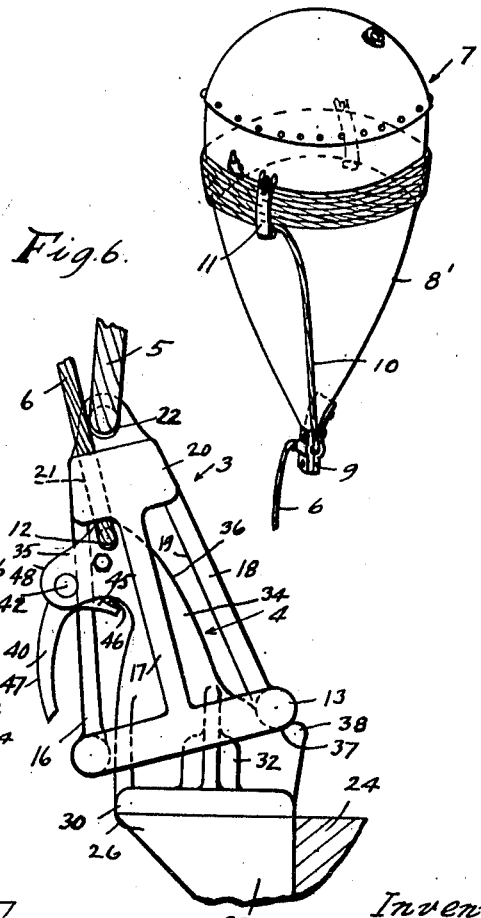
Inventor,
H. J. Bennett,
by Hazard & Miller
Att'ys.

H. J. BENNETT.
APPARATUS FOR RAISING SHIPS.
APPLICATION FILED APR. 8, 1919.
1,314,119.
Patented Aug. 26, 1919.
3 SHEETS—SHEET 2.
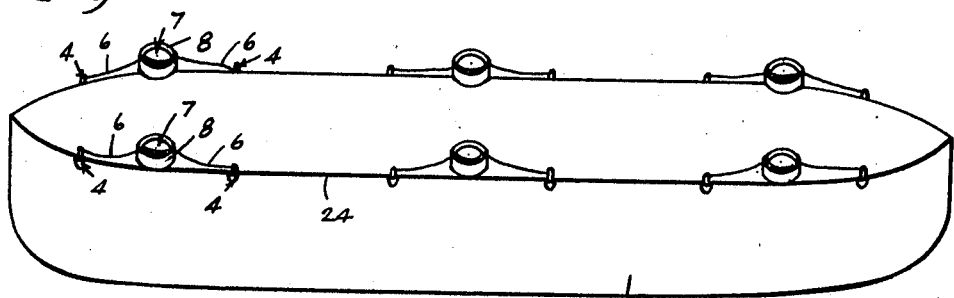
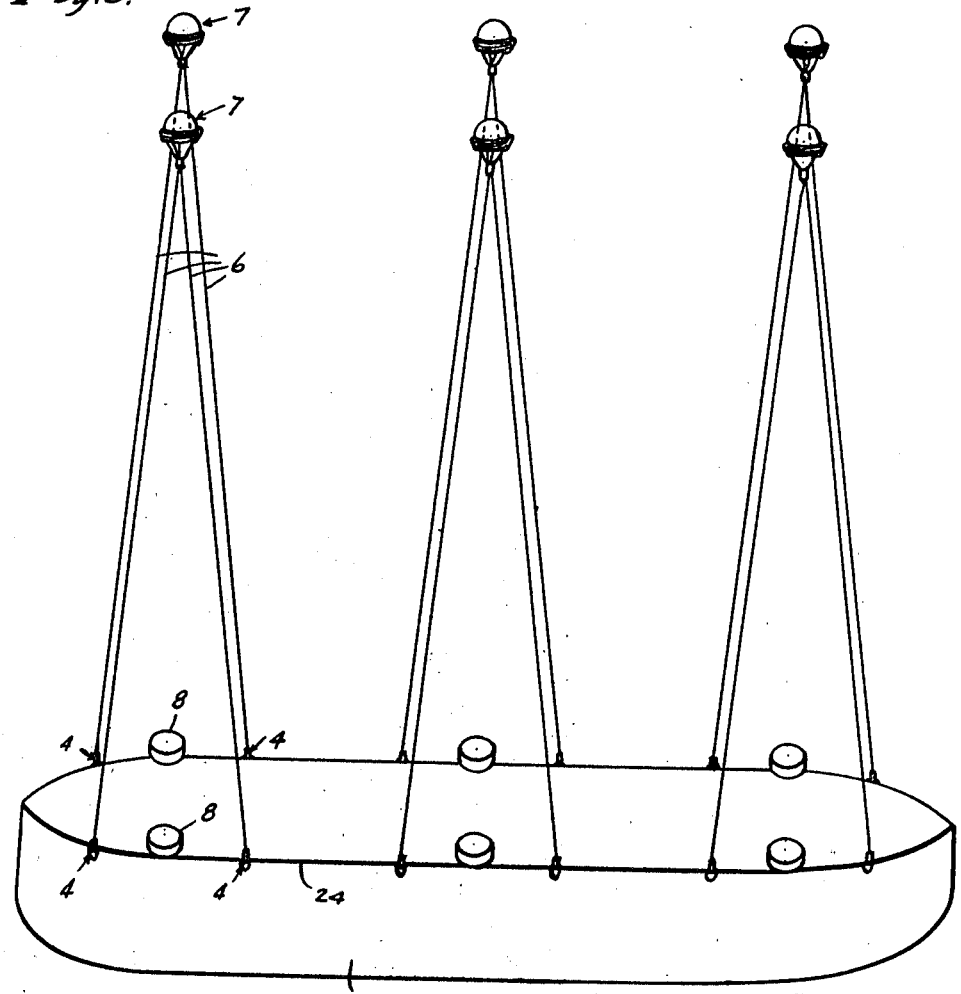
Inventor,
H. J. Bennett,
by Hazard & Miller
Attys.

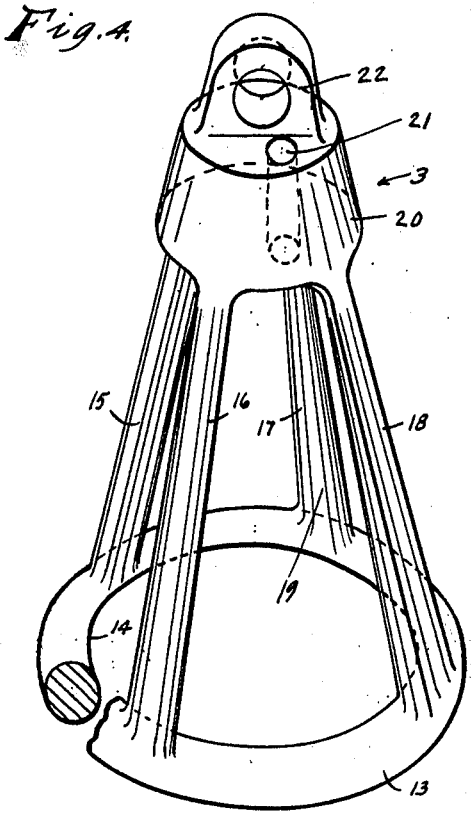
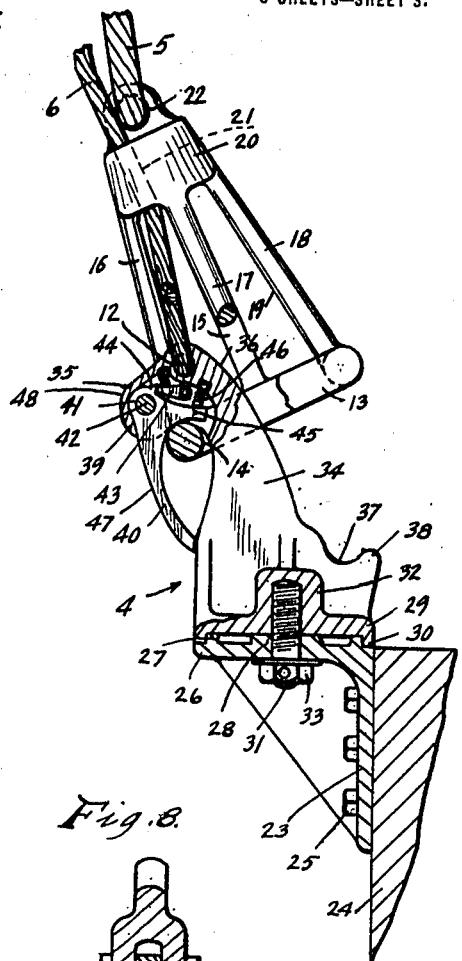
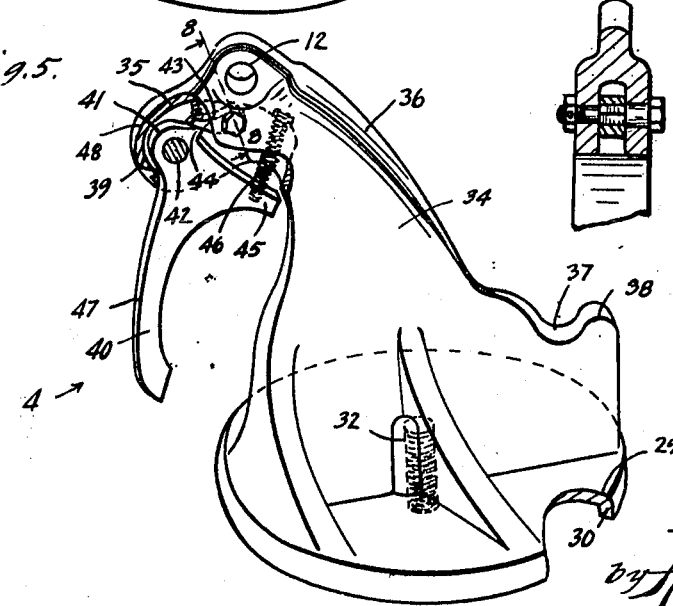

UNITED STATES PATENT OFFICE.

HARRY J. BENNETT, OF PHOENIX, ARIZONA, ASSIGNOR OF ONE-HALF TO SELIM J. MICHELSON, OF PHOENIX, ARIZONA.

APPARATUS FOR RAISING SHIPS.

1,314,119.  Specification of Letters Patent.  Patented Aug. 26, 1919.

Application filed April 8, 1919. Serial No. 288,511.

*To all whom it may concern:*

Be it known that I, HARRY J. BENNETT, a citizen of the United States, residing at Phoenix, in the county of Maricopa and State of Arizona, have invented new and useful Improvements in Apparatus for Raising Ships, of which the following is a specification.

My object is to produce a method and apparatus for raising ships; and my invention consists of the novel features herein shown, described and claimed.

Figure 1 is a view in elevation illustrating my method and apparatus for raising ships.

Fig. 2 is a perspective of a floating ship provided with an apparatus and adapted to be raised in accordance with the principles of my invention, the view being taken before the ship is sunk.

Fig. 3 is a perspective of the ship shown in Fig. 2 after the ship has been sunk.

Fig. 4 is a perspective of the fishing tool used in grappling and raising the ship.

Fig. 5 is a perspective of the clutch member carried by the ship to be grappled by the fishing tool shown in Fig. 4.

Fig. 6 is a fragmentary side elevation of the fishing tool shown in Fig. 4 about to be grappled by the clutch shown in Fig. 5.

Fig. 7 is a view analogous to Fig. 6, parts being broken away and shown in section and showing the fishing tool locked to the clutch as when the salvage ship is raising the sunken ship as shown in Fig. 1.

Fig. 8 is a fragmentary cross section on the line 8—8 of Fig. 5.

Fig. 9 is a perspective of one of the buoys used in locating the sunken ship.

Referring to Fig. 1, the sunken ship 1 is being raised by the salvage ships 2. The salvage ships 2 carry fishing tools 3, and the sunken ship 1 is provided with the clutches 4 to be engaged by the fishing tools 3. The fishing tools 3 are connected to the salvage ships 2 by lifting lines 5, and the fishing tools 3 are guided to the clutches 4 by the buoy lines 6.

Referring to Fig. 2, the ship 1 is provided with a plurality of clutches 4 arranged around the upper parts of the side walls, and the buoy lines 6 are attached to buoys 7 preferably two lines to a buoy, and the lines are coiled with the buoy and placed in carriers 8, the carriers being suitably mounted upon the deck of the ship, so that when the ship sinks the buoys will float and carry the buoy lines upwardly. As the ship goes down the buoys will remain upon the surface of the water, and if the lines are long enough and the water is not too deep the buoys will remain upon the surface of the water to assist the salvage crews in locating the sunken ship 1, and as shown in Fig. 3.

It is proposed that the buoy lines 6 may be five hundred feet long more or less, and that the buoys shall be large enough to carry at least two lines, and that the lines 6 shall be strong enough to serve the purpose. Any desired number of buoys and lines may be attached to a ship, and the number will be increased or decreased in accordance with the size of the ship.

Referring to Fig. 9, the buoys 7 may be pear shaped sheet metal shells 8' made air tight. The upper end of the line 6 will be secured to the lower point of the shell 8' by a clamp 9, and the portion 10 of the line 6 above the clamp 9 will be wound around the buoy shell 8' and held in place by a clamp 11.

Referring to Fig. 5, the lower end of the line 6 will be connected to the clutch 4 by tying the line through the eye 12.

Referring to Fig. 4, the details of the fishing tool 3 are as follows:

The ring 13 has a smooth rounded inner face 14, and arms 15, 16, 17 and 18 extend upwardly from one side of the ring 13, said arms being located radially around the ring and evenly spaced apart, and the inner face 19 of the arms being rounded and flush with the inner face 14 of the ring, and the arms are inclined inwardly as they pass upwardly. The head 20 is formed integral with the upper ends of the arms 15, 16, 17 and 18 and has a vertical opening 21 through which the line 6 will slide. The eye 22 is formed integral with the head 20 and the lower end of the lifting line 5 is attached to the eye 22.

Referring to Fig. 5, the details of the clutch 4 are as follows:

The supporting bracket comprises the attaching plate 23 secured to the hull 24 of the ship by bolts 25, the turntable 26 extending outwardly from the attaching plate 23 and having an annular track flange 27 extending upwardly, and a central hub 28. The turntable 26 is at right angles to the attaching plate 23 and the bracket is mounted with the idea of having the turntable normally in a horizontal position. The base 29 has a track flange 30 fitting the track flange 27, so that the base may rotate upon the turntable 26. A stud bolt 31 is fixed in the hub 32 of the base 29 and extends downwardly loosely through the hub 28, and a nut 33 is screwed upon the stud against the bottom of the turntable to hold the base rotatably in position. A neck 34 extends upwardly and outwardly from the base 29, and a head 35 is formed upon the upper end of the neck and extends outwardly. The eye 12 forms a part of the head 35, the line 36 extends from the top of the eye 12 downwardly and inwardly to the seat 37, and a horn 38 extends upwardly and inwardly from the seat 37. A bifurcation 39 extends upwardly from the lower side of the head 35. A grappling horn 40 is formed integral with a bearing 41, the bearing 41 is placed in the bifurcation 39, and a pin 42 is inserted through the bifurcated head 35 and through the bearing 41, so that the horn 40 may swing in and out. A spring pawl 43 is mounted in the bifurcation 39 to engage a tooth 44 extending from the bearing 41, an arm 45 extends from the bearing 41 at right angles to the horn 40, and an expansive coil spring 46 is seated in the bottom of the bifurcation 39 to engage the arm 45, the tension of the spring being exerted to throw the horn 40 outwardly when the pawl 43 is lifted to allow the tooth 44 to pass.

When the ship 1 is being equipped for the sea, the clutches 4 are set with the horns 40 extending outwardly, and the outer face 47 of the horn 40 forms a continuation of the outer face 48 of the head 35.

When the fishing tool 3 passes down the buoy lines 6 the ring 13 will pass around the eye 12, and the inner face 14 of the ring will follow the line 36 to the seat 37, or will follow the face 48 and the face 47 to a position below the lower end of the horn 40. During this operation the horn 40 may swing inwardly against the tension of the spring 46 to any extent, but not far enough for the tooth 44 to pass the pawl 43. Then when the fishing tool has reached the seat 37, as in Fig. 6, the point of the horn 40 will be outside of the plane of the ring 13, and when the lifting lines 5 are pulled upwardly by the salvage ship the ring 13 will pass inside of the horn and engage the arm 45 and continuous upward movement will swing the horn 40 inwardly until the tooth 44 passes the pawl 43, and then the connection between the salvage ship and the sunken ship is fixed and the work of raising the ship may be proceeded with.

The tension of the buoys 7 through the buoy lines 6 will swing the clutch 4 on the turntable, so that the neck 34 will always be in line with the buoy lines.

Thus I have produced a method and apparatus for raising ships whereby a ship may be equipped with clutches, buoy lines connected to the clutches, buoys connected to the buoy lines and mounted in carriers, so that when the ship is sunk the buoys will float and carry the lines to the surface of the water; and whereby the salvage ship may be equipped with fishing tools and lifting cables connected to the fishing tools, so that the salvage ship may proceed to the vicinity of the sunken ship, disconnect the buoys from the buoy lines, thread the bouy lines through the fishing tools, let the fishing tools down the buoy lines, the buoy lines guiding the fishing tools to the clutches, then operate the lifting lines to raise the sunken ship.

When the salvage boats go to the scene of the wreck the operators will first undo the clamps 11 from the buoys 7 and unwind the portions 10 of the lines 6 and secure the upper ends of these portions to the salvage ship and then raise the buoys and remove the cap plates from the clamps 9 to disconnect the buoys from the lines 6.

Various changes may be made without departing from the spirit of my invention as claimed.

I claim:

1. In an apparatus for raising ships, a clutch adapted to be attached to a ship, said clutch comprising a supporting bracket having a vertical attaching plate and a horizontal turntable extending outwardly from the top of the attaching plate; a base fitting rotatably upon the turnable; a bolt connecting the base to the turntable; a neck extending upwardly and outwardly from the base; a head upon the upper end of the neck and projecting outwardly; an eye extending upwardly from the head, there being a bifurcation extending upwardly from the lower part of the head; a bearing fitting in the bifurcation; a pin extending through the head and through the bearing; a horn extending downwardly from the bearing; a spring pawl mounted in the bifurcation; a tooth extending from the bearing to engage the pawl; an arm extending inwardly from the bearing at right angles to the horn and at the upper end of the horn; and a coil spring in the bifurcation between the head and the arm.

2. In an apparatus for raising ships, a clutch adapted to be attached to a ship, said clutch comprising a supporting bracket having a vertical attaching plate and a horizontal turntable extending outwardly from the top of the attaching plate; a base fitting rotatably upon the turntable; a bolt connecting the base to the turntable; a neck extending upwardly and outwardly from the base; a head upon the upper end of the neck and projecting outwardly; an eye extending upwardly from the head, there being a bifurcation extending upwardly from the lower part of the head; a bearing fitting in the bifurcation; a pin extending through the head and through the bearing; a horn extending downwardly from the bearing; a spring pawl mounted in the bifurcation; a tooth extending from the bearing to engage the pawl; an arm extending inwardly from the bearing at right angles to the horn and at the upper end of the horn; a coil spring in the bifurcation between the head and the arm; a buoy line attached to the eye; a lifting line; a fishing tool attached to the lifting line and comprising a ring having a smooth round inner face; arms extending upwardly from the ring; and a head at the upper ends of the arms and having a vertical opening through which the buoy line passes; so that the fishing tool will be guided downwardly by the buoy line, and so that the ring will pass downwardly around the head and around the horn and pass upwardly inside of the horn and engage the arm to compress the spring to swing the horn inwardly until the pawl engages the tooth to lock the horn to lock the ring to the clutch.

In testimony whereof I have signed my name to this specification.

H. J. BENNETT.

Copies of this patent may be obtained for five cents each, by addressing the "Commissioner of Patents, Washington, D. C."